(12) United States Patent
Sadil et al.

(10) Patent No.: US 8,015,996 B2
(45) Date of Patent: Sep. 13, 2011

(54) GAS TURBINE ENGINE AIR VALVE ASSEMBLY

(75) Inventors: Andreas Sadil, Newington, CT (US); William W. Pankey, Palm Beach Gardens, FL (US)

(73) Assignee: United Technologies Corporation, Hartford, CT (US)

( * ) Notice: Subject to any disclaimer, the term of this patent is extended or adjusted under 35 U.S.C. 154(b) by 1821 days.

(21) Appl. No.: 11/118,583

(22) Filed: Apr. 28, 2005
(Under 37 CFR 1.47)

(65) Prior Publication Data
US 2011/0120084 A1 May 26, 2011

(51) Int. Cl.
*F16K 3/08* (2006.01)
(52) U.S. Cl. .................. 137/625.31; 60/226.3; 251/279
(58) Field of Classification Search .................. 251/279, 251/280; 239/265.35; 137/625.31; 60/39.23, 60/230, 228, 226.3
See application file for complete search history.

(56) References Cited

U.S. PATENT DOCUMENTS

| | | | | |
|---|---|---|---|---|
| 3,070,390 A | * | 12/1962 | Schroter et al. ............... | 403/354 |
| 3,776,467 A | * | 12/1973 | Riemerschmid ......... | 239/265.35 |
| 5,136,840 A | * | 8/1992 | Nash ............................ | 60/226.3 |
| 6,226,977 B1 | * | 5/2001 | Ichiryu et al. ................ | 60/39.23 |
| 6,694,723 B2 | | 2/2004 | Ward | |
| 6,742,324 B2 | * | 6/2004 | Bachelder et al. ........... | 60/226.3 |
| 7,854,124 B2 | * | 12/2010 | Sadil et al. ...................... | 60/771 |

FOREIGN PATENT DOCUMENTS

| | | |
|---|---|---|
| DE | 19816645 A1 | 10/1999 |
| EP | 1348835 A2 | 1/2003 |
| EP | 1428986 A | 6/2004 |
| GB | 2210108 A | 1/1989 |
| JP | 10026353 A | 1/1998 |

OTHER PUBLICATIONS

European Search Report for EP06251065, dated Jul. 13, 2009.

* cited by examiner

*Primary Examiner* — John K Fristoe, Jr.
*Assistant Examiner* — Andrew J Rost
(74) *Attorney, Agent, or Firm* — Bachman & LaPointe, P.C.

(57) ABSTRACT

A gas turbine engine air valve assembly has first and second valving elements. The second element is rotatable about a first axis relative to the first element. The rotation controls a flow of air through the first and second elements. An actuator is coupled by a linkage to the second element. The linkage includes a spindle having a first portion coupled to the actuator to rotate the spindle about a second axis. A guided spherical bearing couples a second portion of the spindle to the second element.

21 Claims, 6 Drawing Sheets

GAS TURBINE ENGINE AIR VALVE ASSEMBLY

U.S. GOVERNMENT RIGHTS

The invention was made with U.S. Government support under contract N00019-02-C-3003 awarded by The U.S. Navy. The U.S. Government has certain rights in the invention.

BACKGROUND OF THE INVENTION

This invention relates to a valve assembly for a gas turbine engine. Specifically, this invention relates to a valve assembly that controls the amount of cooling air supplied to a nozzle of a gas turbine engine.

The major components of a typical gas turbine engine may include (beginning at the upstream end, or inlet) a compressor section, a burner (combustor) section, a turbine section, and a nozzle section. The engine may have an afterburner section between the turbine section and the nozzle section.

If the engine is a turbofan, then the compressor section includes a fan section, typically at the upstream end. After passing the fan section, the turbofan engine separates the air into two flow paths. A primary flow (also referred to as core engine flow) enters the remainder of the compressor section, mixes with fuel, and combusts in the burner section. The gases exit the burner section to power the turbine section.

A secondary flow (also referred to as bypass flow) avoids the remainder of the compressor section, the burner section and the turbine section. Instead, the secondary flow travels through a duct to a location downstream of the turbine section. The secondary flow mixes with the primary flow downstream of the turbine section.

The afterburner section may augment the thrust of the engine by igniting additional fuel downstream of the turbine section. The flow then exits the engine through the nozzle.

The engine may supply cooling air to the nozzle in order to protect the nozzle components from the high temperature exhaust. Typically, the engine diverts secondary flow from the fan section to cool the nozzle section.

The greatest demand for cooling air to the nozzle occurs when the afterburner operates. As an example, the pilot operates the engine at maximum thrust (with the afterburner operating) in a conventional take-off and landing (CTOL) operation. CTOL operation typically requires a large amount of cooling air for the nozzle.

Certain non-augmented operations of the engine (i.e., without the afterburner operating) also require cooling air. However, the amount of cooling air need is typically a reduced amount from augmented operations. As an example, a short take-off vertical landing (STOVL) operation typically requires maximum non-augmented thrust from the engine. The non-augmented exhaust, while still at an elevated temperature, typically exhibits a lower temperature than during augmented operations. Accordingly, the engine can accept a reduced supply of cooling air for the nozzle in STOVL operation.

Flow of the cooling air may be controlled by one or more valves. Exemplary valve structures are shown in U.S. Pat. No. 6,694,723, the disclosure of which is incorporated by reference herein as if set forth at length.

SUMMARY OF THE INVENTION

One aspect of the invention involves a gas turbine engine air valve assembly having first and second valving elements. The second element is rotatable about a first axis relative to the first element. The rotation controls a flow of air through the first and second elements. An actuator is coupled by a linkage to the second element. The linkage includes a spindle having a first portion coupled to the actuator to rotate the spindle about a second axis. A guided bearing couples a second portion of the spindle to the second element. The bearing may be a spherical bearing. The rotation may be in the absence of translation. The assembly may be provided in a reengineering or remanufacturing situation.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
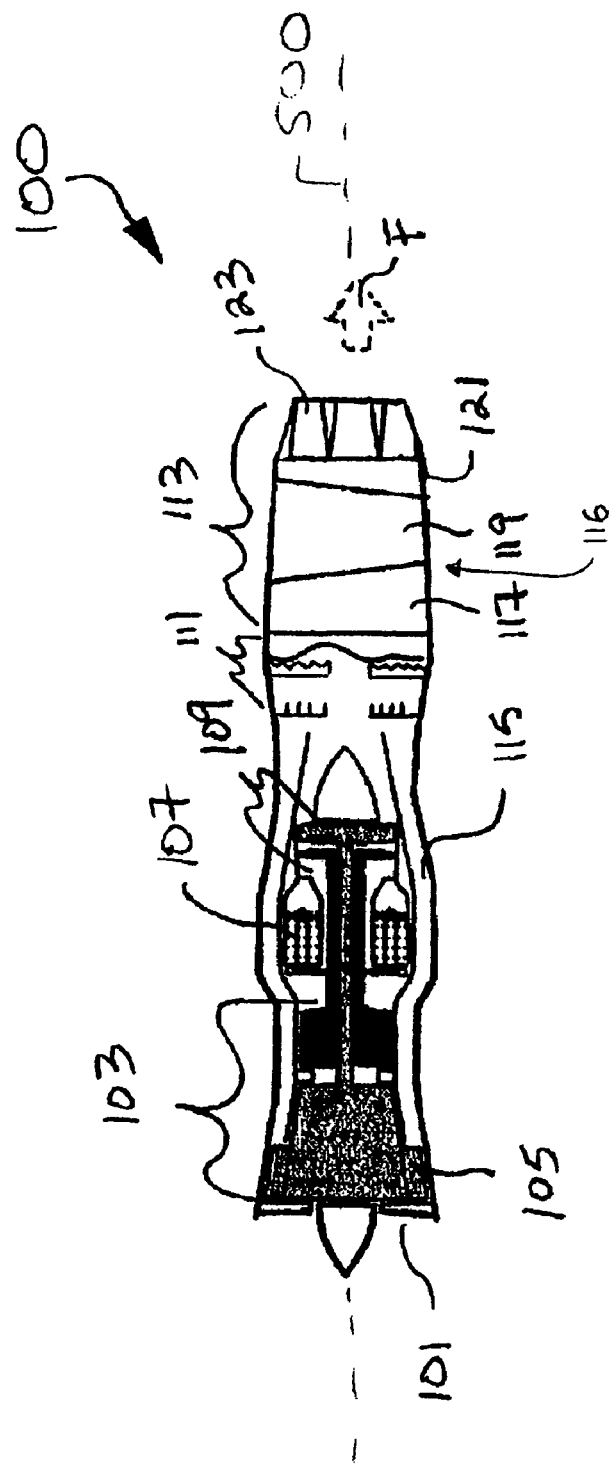
FIG. 1 is a partially schematic cut-away view of an exemplary gas turbine engine in a first condition/configuration.
Figure 2:
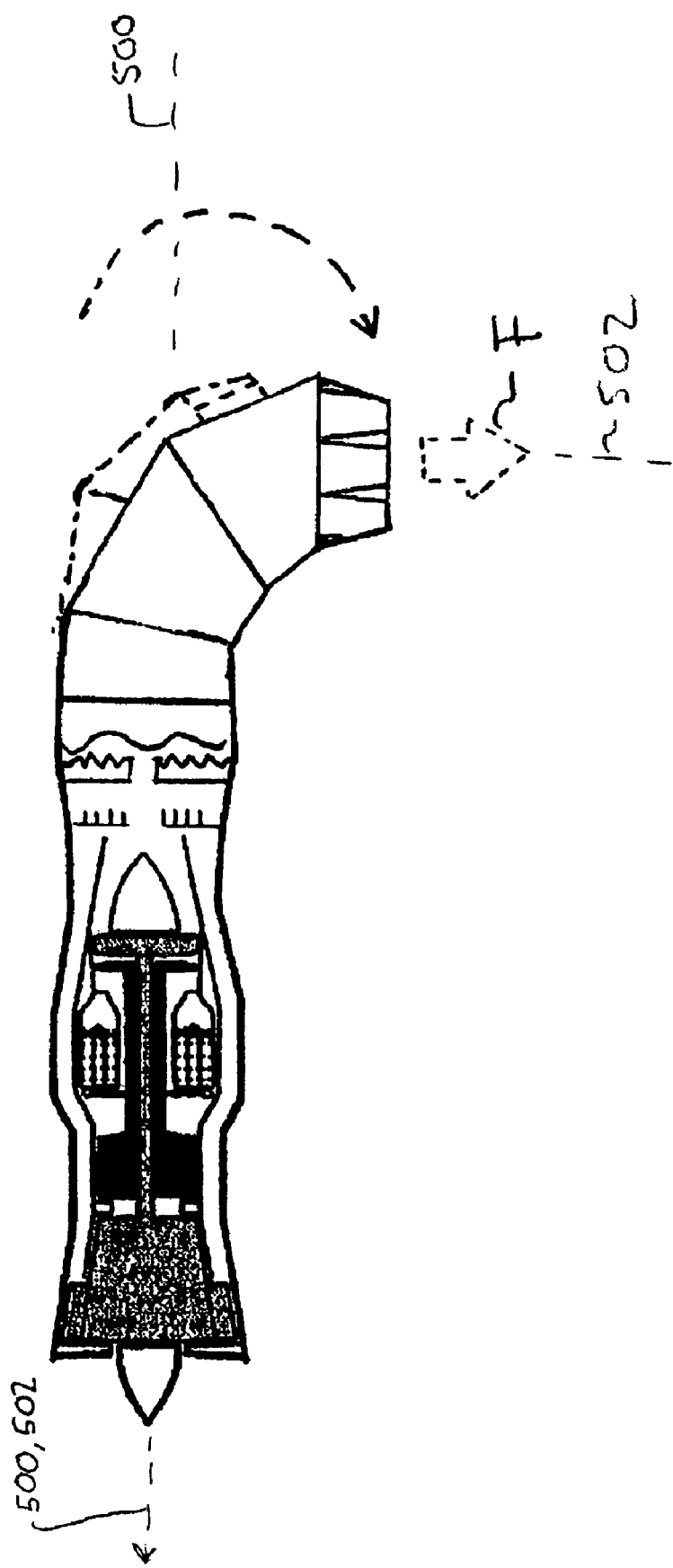
FIG. 2 is a view of the engine of FIG. 1 in a second condition/configuration.

FIGS. 1 and 2 show an exemplary engine 100 in two different configurations. FIG. 1 shows the engine 100 in a first configuration, such as a conventional take-off and landing (CTOL) configuration. FIG. 2 shows the engine 100 in a second configuration, such as a short take-off vertical landing (STOVL) configuration. FIG. 2 also shows, in phantom line, the engine 100 in transition between the CTOL and STOVL configurations.

The engine 100 has an inlet 101, a compressor section 103, a burner section 107, a turbine section 109, an afterburner section 111, and a nozzle section 113. The compressor section 103 includes a fan section 105 at the upstream end. The engine 100 also includes a bypass duct 115 for the secondary flow of air. The air flows through the engine 100 in the direction indicated by arrow F. The engine spools or rotors rotate about an axis 500 which may be at least partially coincident with an engine centerline 502. In the STOVL configuration, the centerline 502 departs from the axis 500 downstream of the rotors.

The nozzle section 113 includes a three bearing swivel duct 116 secured to the afterburner section 111 and a nozzle downstream of the duct. The three bearing swivel duct has three sections 117, 119, 121. The first section 117 rotatably mounts to the afterburner section 111. The second section 119 rotatably mounts to the first section 117. Finally, the third section 121 rotatably mounts to the second section 119. Conventional motors (not shown) can rotate the sections 117, 119, 121 to any desired exhaust path between the first configuration shown in FIG. 1 and the second configuration shown in FIG. 2.

The nozzle can be a conventional flap-type convergent-divergent nozzle 123 or any other suitable nozzle. The nozzle 123 is secured to the third section 121 of the swivel duct.

Figure 3:
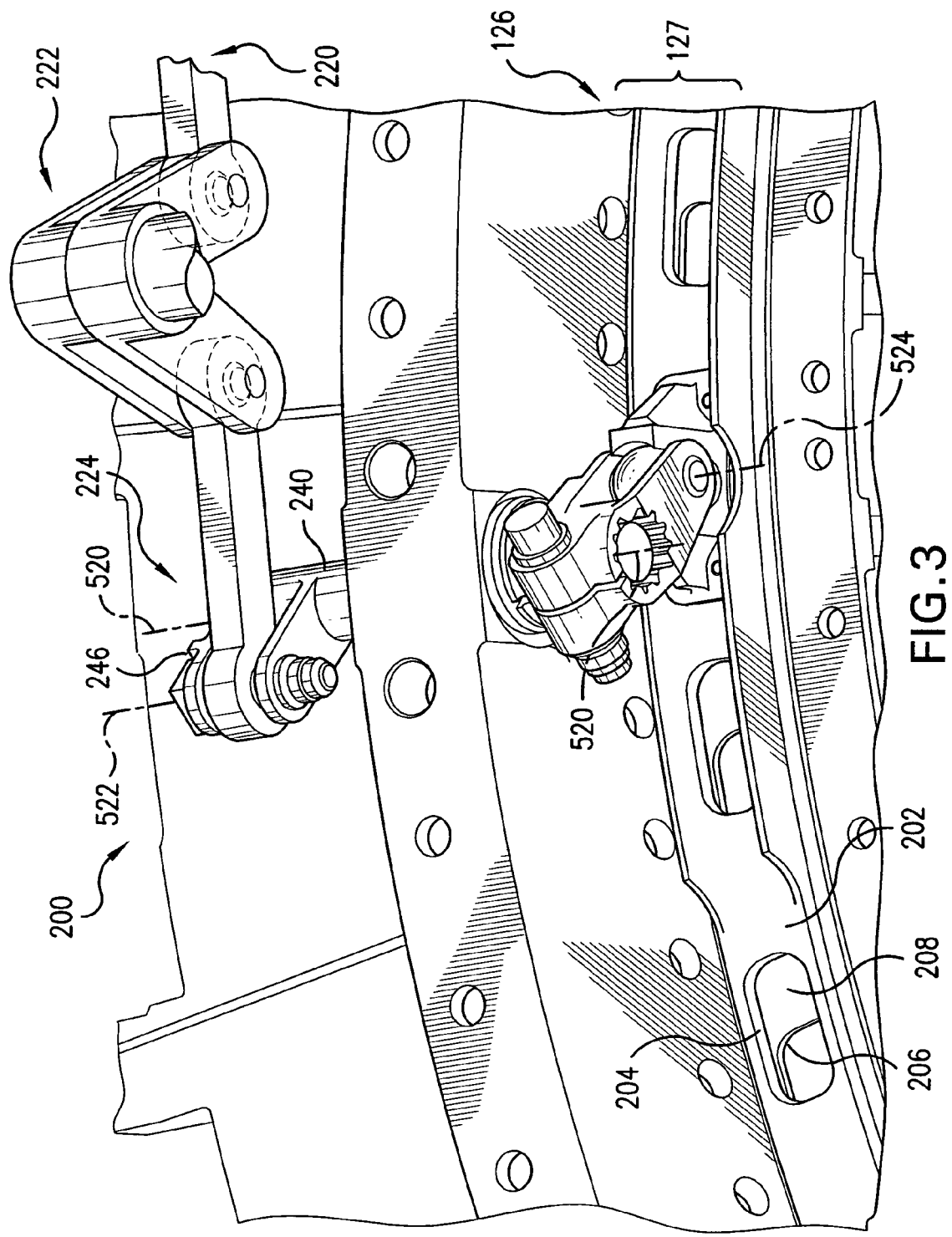
FIG. 3 is a partial longitudinal view of a nozzle cooling valve of the engine of FIG. 1 in a first orientation.

The nozzle section 113 includes a liner (not shown). The liner separates the outer structure of the nozzle section 113 from the hot exhaust gases traveling through the nozzle section. The liner and the outer structure 126 of the nozzle section 113 form an annular chamber 127 (FIG. 3). The engine 100 distributes cooling air through the annular chamber to cool the liner. After cooling the liner, the cooling air continues downstream to cool the nozzle flaps. A bleed (not shown) from the bypass duct 115 supplies the cooling air to the nozzle section 113 using conventional techniques.

Figure 4:
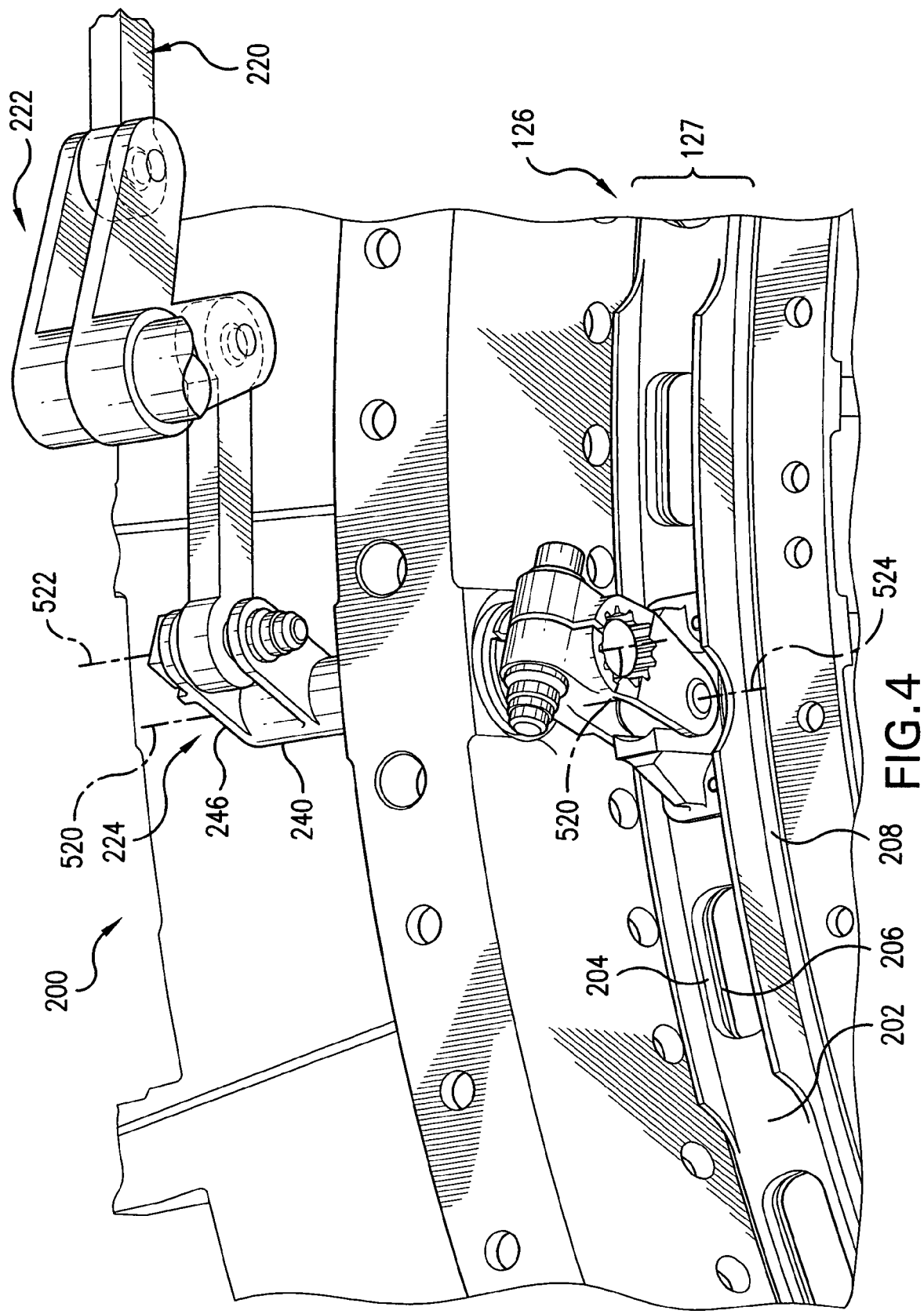
FIG. 4 is a partial longitudinal view of the nozzle cooling valve of the engine of FIG. 1 in a second orientation.

A valve assembly 200 (FIG. 3) controls the amount of cooling air supplied to the nozzle flaps. The exemplary valve assembly includes an annular rotary gate 202 which may be rotated about the local engine centerline 502 (FIG. 2). The gate 202 has a circumferential array of apertures 204. The apertures 204 may have a degree of overlap with apertures 206 in a static element 208 abutting the gate 202. The rotation of the gate 202 between first and second orientations determines the degree of aperture overlap (and thus of non-occlusion) and thus the effective flow area through the valve between minimum and maximum values. The minimum value may be zero (e.g., fully closed) or some greater amount. For example, the FIG. 3 condition is approximately half occluded and may represent a minimum flow area condition. FIG. 4 shows essentially no occlusion and thus a maximum flow area condition.

Rotation of the gate between the first and second orientations may be achieved by means of an actuator 220 acting via a linkage 222. The exemplary linkage 222 includes a spindle 224 held for rotation about an axis 520 (e.g., a radial axis orthogonal to and intersecting the engine centerline). The actuator 220 may rotate the spindle 224 between first and second orientations associated with the first and second gate orientations/conditions. The actuator 220 may be pneumatic, hydraulic, electrical, electro-mechanical, or any other appropriate type. For example, the actuator 220 may be constructed as in U.S. Pat. No. 6,694,723 (the '723 patent).

FIGS. 3 and 4 show further details of the valve assembly 200. The static element 208 is shown unitarily-formed with and extending radially inboard from a proximal/upstream portion of the outer structure 126 of the nozzle 123. The exemplary gate 202 is immediately forward/upstream of the element 208 with the downstream face of the gate 202 facing the upstream face of the element 208. The gate 202 is held for its rotation by support means (not shown). Exemplary support means could comprise a rotary bearing structure permitting rotation of the gate 202 but preventing longitudinal translation and radial shifts. Alternative means could include fasteners secured to one of the gate 202 and element 208 and having a limited range of motion (e.g., along a circumferential slot) in the other. In such a system, the slot ends could act as stops. Yet further alternative means could include an idler crank array as in the '723 patent providing a path combining rotation with longitudinal translation.

Figure 5:
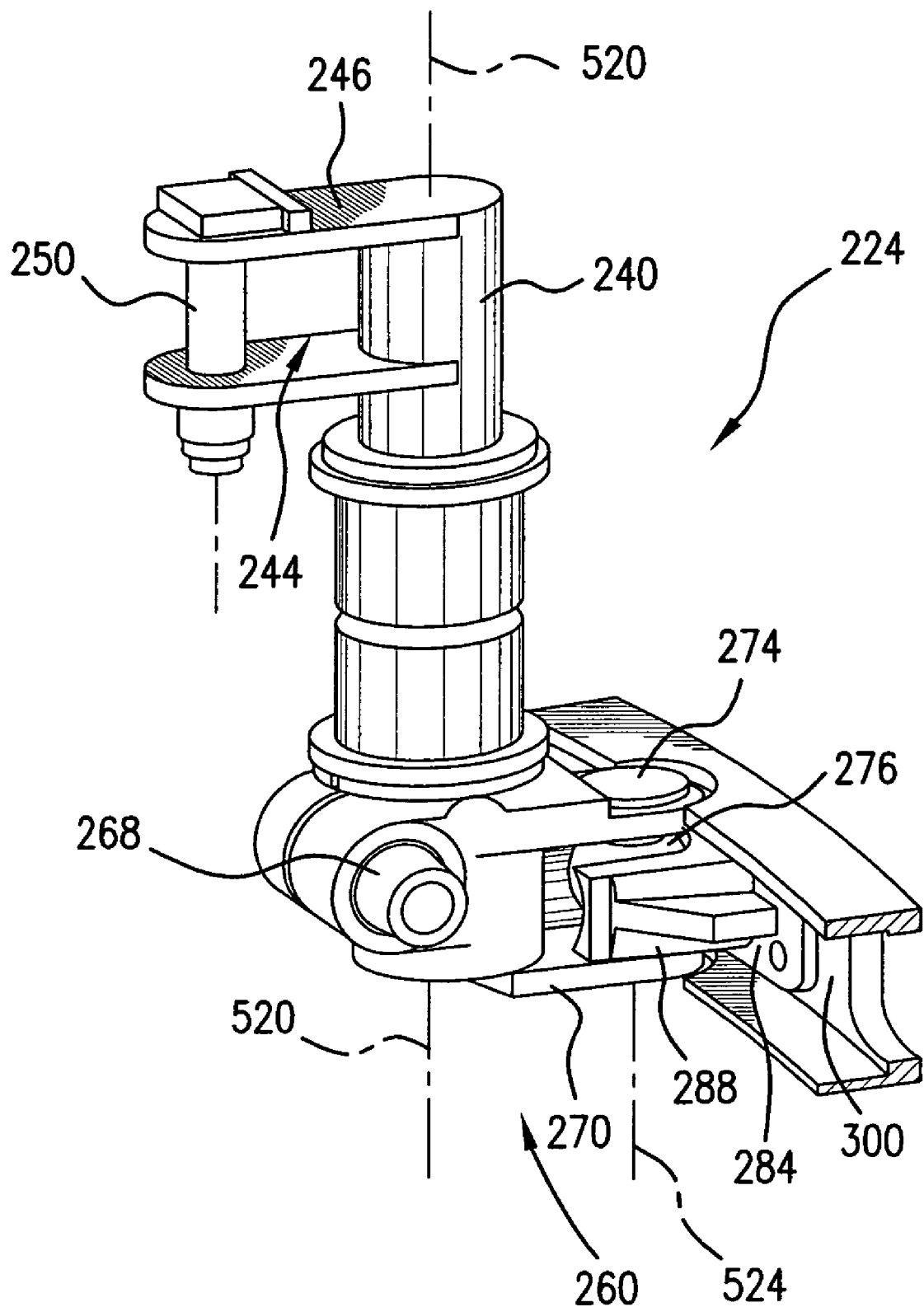
FIG. 5 is a view of a linkage of the valve of FIG. 3.
Figure 6:
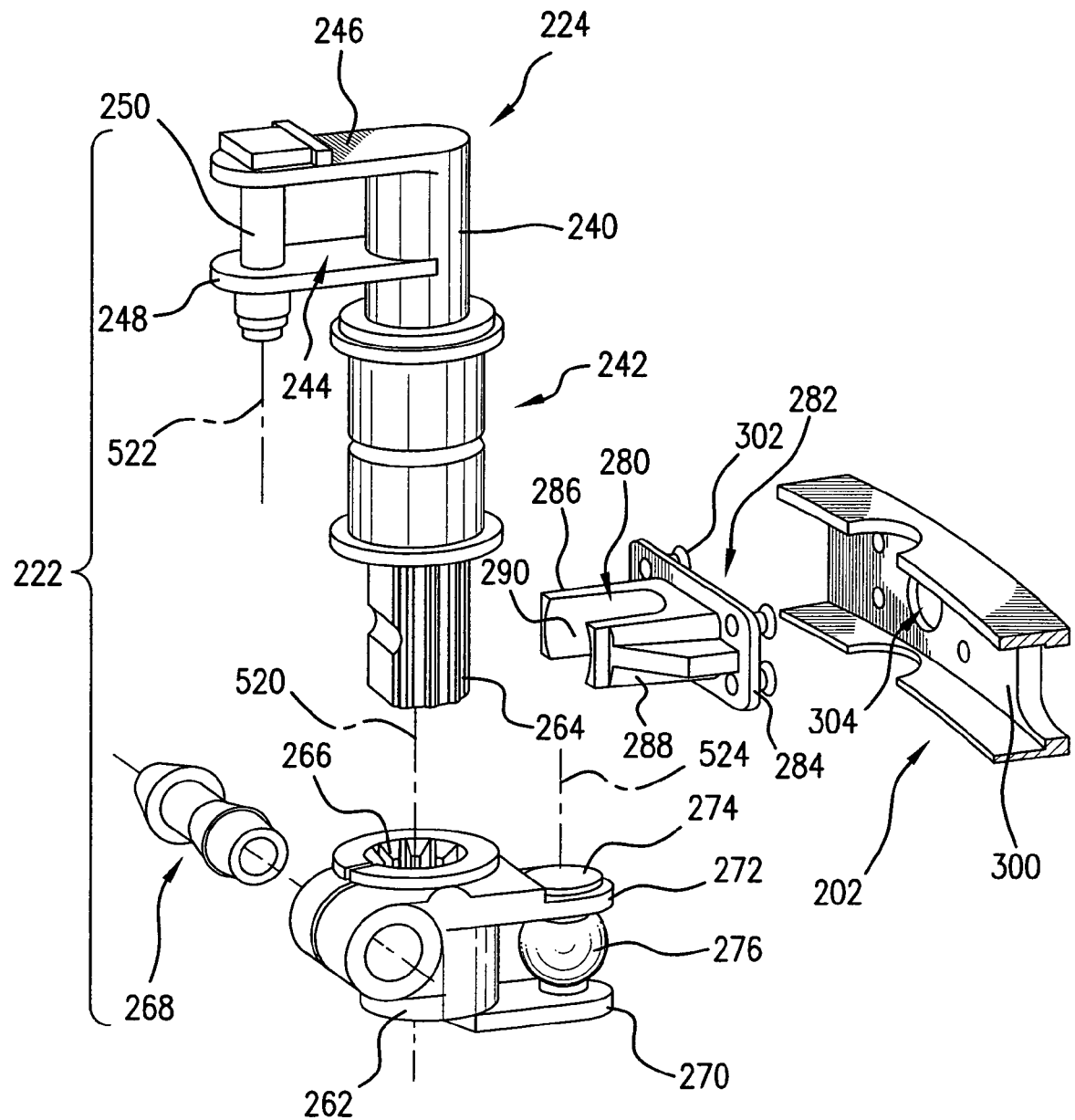
FIG. 6 is an exploded view of the linkage of FIG. 5.

FIGS. 5 and 6 show further details of the linkage 222. A spindle 224 includes a spindle shaft 240. An intermediate portion of the shaft 240 is received within a bushing 242 (e.g., a two-piece bushing). The bushing 242 may be secured within an aperture in the engine static structure (e.g., the exemplary third duct section 121 of FIG. 4). The shaft 240 is thus held by the bushing 242 for rotation about the axis 520. An outboard portion of the spindle shaft 240 includes an input/driving clevis 244. The exemplary clevis 244 is formed by arms 246 and 248 secured (e.g., by welding) to the shaft outboard portion. An input/driving pin 250 spans the arms 246 and 248 and has an axis 522 parallel to and spaced apart from the axis 520. The pin 250 is engaged by the actuator to rotate the spindle 224 about the axis 520. An inboard end of the spindle includes an output/driven clevis 260. The exemplary clevis 260 includes a clevis body 262 separately formed from the spindle shaft and mounted thereon by means of complementary splines. Exemplary splines include external splines 264 (FIG. 6) along the spindle shaft inboard portion and internal splines 266 within the body 262. A bolt or other fastener 268 may extend through the body 262 spanning an expansion slot to secure the body 262 to the shaft 240 against translation.

The body 262 includes arms 270 and 272. A driven/output clevis pin 274 spans the arms and has an axis 524 parallel to and spaced apart from the axis 520. Alternative implementations might include non-parallel axes 522 and/or 524 (e.g., axes intersecting the axis 520 or skew thereto). A spherical bearing 276 has an inner bore receiving the shaft of the pin 274 between the arms 270 and 272. In the exemplary embodiment, the bearing 276 and shaft cooperate to permit the bearing to have non-zero ranges of movement along the axis 524 and rotation about the axis 524.

The bearing 276 is received within a slot 280 in a follower bracket 282. The exemplary bracket 282 includes a base 284 for mounting to the gate 202. A pair of arms 286 and 288 extend forward from the base 284 to define the slot 280 therebetween. Inboard surfaces 290 of the arms 286 and 288 have a concavity complementary to a convexity of the external surface of the bearing 276. The exemplary surfaces 290 are singularly concave to allow the bearing 276 to translate along the slot from a proximal root of the slot to a distal end of the slot. In the exemplary embodiment, the base 284 is secured against a forward/upstream surface of a web 300 of the gate 202 between inboard and outboard flanges. The securing may be by means of fasteners 302 (e.g., rivets). The base may further include a registration protrusion (not shown) for interfitting with a complementary aperture or socket 304 in the web 300.

In operation, movement of the actuator produces a rotation of the spindle 224 about the axis 520. This, in turn, tends to rotate the axis 524 about the axis 520. Rotation of the axis 524 about the axis 520 causes the bearing 276 to transmit a tangential force and thus a torque (about the engine centerline) to the follower 282 and thus to the gate 202. This torque causes rotation of the gate about the engine centerline so as to control the degree of aperture overlap and thus the flow through the valve.

During rotation of the gate, the axis 524 will tend to shift longitudinally (e.g., toward or away from the gate). This shift is accommodated by the sliding interaction of the bearing 276 longitudinally within the slot 280 and radially along the pin 274. This sliding interaction decouples the longitudinal motion of the axis 524 from any longitudinal motion of the gate 202. For example, the gate 202 may exclusively rotate. Alternatively, the gate 202 may have a relatively small translation (e.g., if mounted by idler cranks in such a way that the permitted translation breaks a seal between the gate and the ring 208) so as to avoid sliding friction between the gate and ring.

The exemplary valve assembly 200 may be provided in the remanufacturing of a baseline engine or the reengineering of a baseline engine configuration. The baseline could lack such a valve assembly. For example, the baseline could have a different valve assembly such as that of the '723 patent. This might be particularly relevant if the reengineering included elimination of the idler crank mounting means of the '723 patent in favor of a purely rotational gate movement.

One or more embodiments of the present invention have been described. Nevertheless, it will be understood that various modifications may be made without departing from the spirit and scope of the invention. For example, when applied in a reengineering or remanufacturing of an existing engine or engine configuration, details of the existing engine or configuration may influence details of any particular implementation. Additionally, the valve could be otherwise located (e.g., relatively upstream at a bleed plenum). Accordingly, other embodiments are within the scope of the following claims.

What is claimed is:

1. An air valve assembly for a gas turbine engine comprising:
   a first valving element;
   a second valving element rotatable about a first axis relative to the first valving element to control a flow of air through the first and second elements;
   an actuator; and
   a linkage coupling the actuator to the second valving element to rotate the second valving element between first and second orientations, and comprising:
      a spindle having:
         a first portion coupled to the actuator to rotate the spindle about a second axis; and
         a second portion; and
      a spherical bearing coupling the second portion to the second valving element,
   wherein:
      the spherical bearing has a bearing axis;
      the spherical bearing is mounted to one of the spindle second portion and the second valving element by a clevis pin;
      the spherical bearing has a non-zero range of movement along the clevis pin; and
      a follower on the other of the spindle second portion and the second valving element is slidingly engaging the spherical bearing so that rotation of the spindle shifts the bearing axis longitudinally relative to said other of the spindle second portion and the second valving element.

2. The assembly of claim 1 wherein:
   the spherical bearing is coupled to the spindle second portion so that rotation of the spindle about the second axis rotates the bearing axis about the second axis.

3. The assembly of claim 1 wherein:
   the first axis is at least locally parallel to an engine centerline.

4. The assembly of claim 1 wherein:
   the second axis is nonparallel to the first axis.

5. The assembly of claim 1 wherein:
   the second valving element completely encircles the engine centerline.

6. The assembly of claim 1 wherein:
   the second valving element includes a circumferential array of metering apertures.

7. The assembly of claim 1 wherein:
   the spindle first portion is radially outboard of the spindle second portion.

8. The assembly of claim 1 wherein:
   the spindle has a third portion, between the spindle first portion and the spindle second portion, and rotatably mounting the spindle for said rotation about the second axis.

9. The assembly of claim 1 wherein:
   the spindle comprises a spindle shaft;
   the spindle first portion comprises a first pair of clevis arms unitary with the spindle shaft; and
   the spindle second portion comprises a second pair of clevis arms nondestructively removably mounted to the spindle shaft and coupled thereto against rotation by a splined interfitting.

10. The assembly of claim 1 in combination with said gas turbine engine and positioned so that the air flow cools a nozzle of the engine.

11. The assembly of claim 1 in combination with said gas turbine engine and positioned so that the air flow is a bypass airflow.

12. The assembly of claim 1 wherein:
    said rotation of the second valving element between the first and second orientations is essentially without translation.

13. The air valve assembly of claim 1 wherein:
    the first valving element has a circumferential array of apertures;
    the second valving array has a circumferential array of apertures; and
    the rotation of the second valving element determines a degree of overlap of the apertures of the first valving element with the apertures of the second valving element to thus determine an effective flow area through the air valve assembly between a minimum value and a maximum value.

14. The air valve assembly of claim 13 wherein:
    the minimum value is non-zero.

15. A method for reengineering an engine configuration from a baseline configuration or remanufacturing an engine initially having said baseline configuration, the method comprising:
    at least partially removing a first air valve assembly; and
    installing a second valve assembly, optionally sharing one or more components with the first valve assembly,
    wherein the second air valve assembly is an air valve assembly according to claim 1 and the first air valve assembly is not an air valve assembly according to claim 1.

16. The method of claim 15 wherein:
    the second air valve assembly second valving element is a gate having a range of motion consisting essentially of rotation about said first axis; and
    the first air valve assembly comprises a gate having a range of motion comprising a combined rotation and translation.

17. An air valve assembly for a gas turbine engine comprising:
    a first valving element;
    a second valving element rotatable about a first axis relative to the first valving element to control a flow of air through the first and second elements; and
    means for rotating the second valving element between first and second orientations and comprising:
    a spindle having:
       a driving portion for rotating the spindle about a second axis; and
       a driven portion;
    a bearing having a bearing axis and coupled to the spindle driven portion so that rotation of the spindle about the second axis rotates the bearing axis about the second axis and moves the bearing along the bearing axis while the bearing axis is at a fixed orientation relative to the second axis; and
    a follower coupling the bearing to the second valving element and allowing said rotation of the spindle to longitudinally shift the bearing axis relative to the second valving element.

18. The assembly of claim 17 in combination with said gas turbine engine and positioned so that the air flow cools a nozzle of the engine.

19. The assembly of claim 17 in combination with said gas turbine engine and positioned so that the air flow is a bypass airflow.

20. The assembly of claim 17 wherein the bearing is a spherical bearing.

21. The air valve assembly of claim 14 wherein:
the rotation of the second valving element determines an effective flow area through the valve between a minimum value and a maximum value.

* * * * *